Patented Jan. 12, 1937

2,067,193

UNITED STATES PATENT OFFICE 2,067,193

METHOD OF DEWAXING HYDROCARBON OILS

Leo D. Jones, Philadelphia, Pa., assignor to The Sharples Specialty Company, Philadelphia, Pa., a corporation of Delaware No Drawing. Application February 13, 1935, Serial No. 6,385

13 Claims. (Cl. 196—19)

The present invention relates to the art of removing wax from wax-containing mineral oil stock, such as residues, distillates and solvent extraction stocks derived from them by acid treating and its object has been to provide a solvent adapted to effect the selective separation of oil from wax more thoroughly under economical conditions of operation than has been possible in the practice of the prior art. To this end the invention comprises the discovery of a new selective solvent adapted for use in connection with dewaxing operations, such solvent being cheap to produce and presenting the advantages of a more complete removal of wax from oil and a smaller loss of oil in the wax than can be attained by the use of solvents heretofore commercially applied for this purpose.

The invention consists in the discovery that the two trichlor ethanes and mixtures thereof which may be obtained, for example, by chlorinating ethane or ethyl chloride, possess important advantages when used in the separation of wax from oil. These new solvents are useful in the separation of various types of wax from oil and can be successfully applied to the removal of crystalline, amorphous and intermediate waxes, the physical operation of removing the wax from the stock being accomplished by selective solution of the liquid hydrocarbon with wax particles suspended therein and removal of the wax particles from the solution by centrifuging, filter pressing or settling. The newly discovered solvents of the present invention may be used in connection with the removal of wax by any of these methods. The production of a suspension of the wax to be removed in a solution of the oil in the dewaxing solvent of the invention is preferably accomplished in the conventional manner by dissolving the stock to be dewaxed in the dewaxing solvent at a temperature sufficiently high to effect solution of substantially all of the stock in the solvent and thereafter chilling the solution so formed to effect precipitation of wax therefrom. This wax is thereafter removed by a method appropriate to its character; i. e., either by centrifuging, filter pressing or settling.

In the practice of any process for removing wax from oil, it is naturally desirable that a large proportion of the wax contained in the oil be removed therefrom in order to produce an oil having a low pour point. It is also desirable that loss of oil by entrainment thereof in the wax be avoided as completely as possible, that a wax contaminated with a minimum amount of oil be obtained and that the avoidance of precipitation and separation with wax of oil ingredients of high viscosity index be avoided. While these three factors are intimately co-related, and cannot be considered entirely independently of each other, it has been found that an unusually satisfactory co-ordination of results can be attained by the use of the present dewaxing solvent.

The dewaxing solvent of the present invention has the additional advantage of having a comparatively low vapor pressure, although its boiling point is sufficiently low to enable it to be effectively removed from the petroleum stock after completion of the dewaxing operations.

The following example illustrates the practice of the invention:

A distillate from a Mid Continent petroleum having the following characteristics was used.

| | |
|---|---|
| Gravity | 24.5° A. P. I. |
| Flash | 455° F. |
| Fire | 525° F. |
| Vis. @ 210° F | 65 Sec. S. U. |
| Solid point | 102° F. |
| Color | 4½ N. P. A. |

This was diluted with 1,1,2 trichlor ethane having an average boiling point of 233° F. in the proportion of three parts of solvent to one part of oil and heated to 100° F., at which temperature it was bright.

The mixture was chilled to —10° F. and filtered through canvas to effect separation of wax. The dewaxed oil was washed with diluent similar to that used in the initial wax-separation step, using 1.5 parts of solvent to one part of oil, the wash liquid being added to the dewaxed oil solution.

The solvent was evaporated from oil and wax and an oil was obtained having a solid point of —8° F. The yield was

| | Percent |
|---|---|
| Oil | 87 |
| Wax | 13 |

Dewaxing a similar fraction by the conventional method using naphtha as a diluent and centrifugal separation gave the following yields:

| | Percent |
|---|---|
| Oil | 75 |
| Wax | 25 |

I am aware of the fact that the use of chlorinated derivatives of aliphatic hydrocarbons has heretofore been suggested in connection with the extraction of wax from oil by methods involving procedures which are in general analogous to that described above. Most of these derivatives are not satisfactory for use as the sole diluent in an operation of this character, however, for one of two opposite reasons, to wit, that the various members of this series have either too high an anti-solvent effect upon the oil or too much solvent power for the wax to make it possible to obtain the desired degree of selective removal of these constituents of a petroleum stock from each other. The present invention rests on the discovery that 1,1,2 trichlor ethane is almost ideally suited to an operation of this character by reason of its solvent power for the oil and anti-solvent effect upon the wax. It is a very slight anti-solvent for paraffinic oil at temperatures in the neighborhood of 0° F. and gives pour tests but a few degrees higher than the temperature of separation of the wax from the oil solution and is suitable alone for low and medium viscosity index oils. 1,1,1 trichlor ethane may also be used alone as a dewaxing solvent but yields pour tests about 30° above the temperature of separation, requiring low chilling when working for zero pour test oils. A mixture of the two comprising a larger proportion of the 1,1,2 compound than of the 1,1,1 compound is very satisfactory for obtaining zero pour tests on oils of high viscosity index.

The advantageous anti-solvent characteristics of 1,1,2 trichlor ethane, for example, may be balanced by adding small proportions of trichlor ethylene, dichlor ethylene, benzene, naphtha or other compounds having a high solvent power for the oil. On the other hand 1,1,1 trichlor ethane may be used in combination with ethylene dichloride and propylene dichloride or other anti-solvent compounds.

I wish it to be understood that the invention is not limited to the use of these compounds alone but that either or both of them may be used in conjunction with other diluents.

I claim:

1. The method of dewaxing petroleum stock which comprises selectively extracting oil from the stock by dissolving the oil content of the stock in trichlor ethane and thereafter removing wax from the solution at a temperature sufficiently low to effect precipitation of wax.

2. The method of dewaxing petroleum stock which comprises selectively extracting oil from the stock by dissolving the oil content of the stock in a solvent mixture comprising 1,1,1 trichlor ethane and 1,1,2 trichlor ethane and thereafter removing wax from the solution at a temperature sufficiently low to effect precipitation of wax.

3. The method of dewaxing petroleum stock which comprises selectively extracting oil from the stock by dissolving the oil content of the stock in a solvent mixture comprising 1,1,1 trichlor ethane and thereafter removing wax from the solution at a temperature sufficiently low to effect precipitation of wax.

4. The method of dewaxing wax bearing mineral oil which comprises diluting the oil with a solvent which comprises 1,1,2 trichlorethane, chilling to precipitate the wax and separating the wax from the diluted oil.

5. The method of dewaxing petroleum stock which comprises selectively extracting oil from the stock by dissolving the oil content of the stock in an isomeric mixture consisting of 1,1,1 trichlor ethane and 1,1,2 trichlor ethane in approximately equal proportions and thereafter removing wax from the solution at a temperature sufficiently low to effect precipitation of wax.

6. The method of dewaxing petroleum stock which comprises selectively extracting oil from the stock by dissolving the stock in trichlor ethane at a temperature sufficiently high to effect solution of both oil and wax in the solvent and thereafter chilling the solution to a temperature sufficiently low to effect precipitation of wax and removing precipitated wax from the oil solution.

7. The method of dewaxing petroleum stock which comprises selectively extracting oil from the stock by dissolving the stock in trichlor ethane at a temperature sufficiently high to effect solution of both oil and wax in the solvent and thereafter chilling the solution to a temperature sufficiently low to effect precipitation of wax and removing precipitated wax from the oil solution by centrifugal force.

8. The method of dewaxing petroleum stock which comprises selectively extracting oil from the stock by dissolving the stock in trichlor ethane at a temperature sufficiently high to effect solution of both oil and wax in the solvent and thereafter chilling the solution to a temperature sufficiently low to effect precipitation of wax and removing precipitated wax from the oil solution by filtration.

9. The method of dewaxing petroleum stock which comprises selectively extracting oil from the stock by dissolving the stock in trichlor ethane at a temperature sufficiently high to effect solution of both oil and wax in the solvent and thereafter chilling the solution to a temperature sufficiently low to effect precipitation of wax and removing precipitated wax from the oil solution by gravity subsidence.

10. The method of dewaxing petroleum stock which comprises selectively extracting oil from the stock by dissolving the oil content of the stock in a mixture comprising 1,1,2 trichlor ethane and a chemical compound having a higher selective solvent power for the oil with respect to the wax than the added 1,1,2 trichlor ethane and thereafter removing wax from the solution at a temperature sufficiently low to effect precipitation of wax.

11. The method of dewaxing petroleum stock which comprises selectively extracting oil from the stock by dissolving the oil content of the stock in a mixture comprising 1,1,1 trichlor ethane and a chemical compound having a lower selective solvent power for the oil with respect to the wax than the added 1,1,1 trichlor ethane and thereafter removing wax from the solution at a temperature sufficiently low to effect precipitation of wax.

12. The method of dewaxing petroleum stock which comprises selectively extracting oil from the stock by dissolving the oil content of the stock in a mixture comprising 1,1,2 trichlor ethane and a compound chosen from the class consisting of trichlor ethylene, dichlor ethylene, benzene and naphtha, and thereafter removing wax from the solution at a temperature sufficiently low to effect precipitation of wax.

13. The method of dewaxing petroleum stock which comprises selectively extracting oil from the stock by dissolving the oil content of the stock in a mixture comprising 1,1,1 trichlor ethane and a compound chosen from the class consisting of ethylene dichloride and a propylene dichloride and thereafter removing wax from the solution at a temperature sufficiently low to effect precipitation of wax.

LEO D. JONES.